US012637639B2

(12) United States Patent
Harrer

(10) Patent No.: US 12,637,639 B2
(45) Date of Patent: May 26, 2026

(54) RESIDUE EMPTYING

(71) Applicant: Bühler GmbH, Beilngries (DE)

(72) Inventor: Robert Harrer, Beilngries (DE)

(73) Assignee: Bühler GmbH, Beilngries (DE)

( * ) Notice: Subject to any disclaimer, the term of this patent is extended or adjusted under 35 U.S.C. 154(b) by 1084 days.

(21) Appl. No.: 17/310,925

(22) PCT Filed: Feb. 6, 2020

(86) PCT No.: PCT/EP2020/052949
§ 371 (c)(1),
(2) Date: Aug. 31, 2021

(87) PCT Pub. No.: WO2020/192991
PCT Pub. Date: Oct. 1, 2020

(65) Prior Publication Data
US 2022/0135917 A1      May 5, 2022

(30) Foreign Application Priority Data

Mar. 22, 2019    (EP) ..................................... 19164503

(51) Int. Cl.
*C12C 1/15*          (2006.01)
*C12C 1/027*         (2006.01)
*C12C 1/033*         (2006.01)
(52) U.S. Cl.
CPC .............. *C12C 1/15* (2013.01); *C12C 1/0275* (2013.01); *C12C 1/033* (2013.01)
(58) Field of Classification Search
CPC .......... C12C 1/15; C12C 1/0275; C12C 1/033
See application file for complete search history.

(56) References Cited

U.S. PATENT DOCUMENTS 3,840,435 A    10/1974  Damon
4,034,967 A *   7/1977  Gustairs ................ B01F 27/922
                                              366/322
(Continued)

FOREIGN PATENT DOCUMENTS

CN          2599012 A      1/2004
CN          1692155 A     11/2005
(Continued)

OTHER PUBLICATIONS

English Translation of Written Opinion for Intl App PCT/EP2020/052949 (Year: 2020).*

(Continued)

*Primary Examiner* — William H. Beisner
*Assistant Examiner* — Danielle B Henkel
(74) *Attorney, Agent, or Firm* — Colson Law Group, PLLC

(57)          ABSTRACT
A germination box having a container for receiving grain. A beam is arranged inside the container. Arranged on the beam is a conveyor device, in particular a worm screw, which is arranged horizontally with respect to a base and serves to load and unload the container, wherein the conveyor device is movable in a vertical direction. A plurality of turning screws, arranged vertically with respect to the base, are mounted on the beam and are operated in pairs in opposite directions in order to turn the grain. Stripping tools are mounted at an end of each of the turning screws facing towards the base. The turning screws are configured to be operated in the same directions in order to empty the germination box. The invention makes available a method for emptying the germination box according to the invention, and a method for retrofitting a germination box.

13 Claims, 6 Drawing Sheets

(56)         References Cited

U.S. PATENT DOCUMENTS

Figure 1:
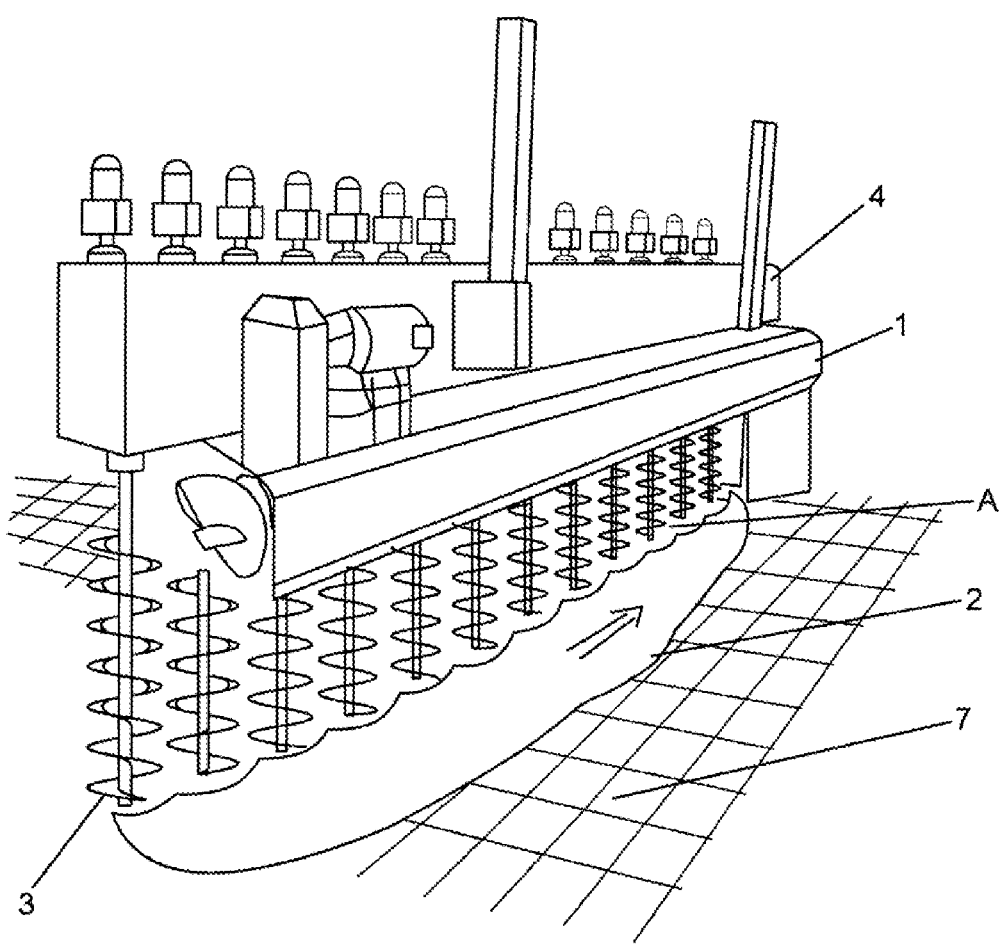

| | | | | |
|---|---|---|---|---|
| 5,587,298 | A | * | 12/1996 | Horigane ............... C12M 27/00 |
| | | | | 422/135 |
| 2005/0170043 | A1 | * | 8/2005 | Harris ..................... C12C 1/073 |
| | | | | 426/28 |
| 2015/0307825 | A1 | * | 10/2015 | Görlitz .................. C12M 27/02 |
| | | | | 435/291.1 |

FOREIGN PATENT DOCUMENTS

| | | | |
|---|---|---|---|
| CN | 201433202 | A | 3/2010 |
| CN | 103842492 | A | 6/2014 |
| DE | 1186820 | B | 2/1965 |
| DE | 1442114 | A1 | 11/1969 |
| DE | 102004032442 | A1 | 1/2006 |
| EP | 1641909 | A1 | 4/2006 |
| EP | 2258822 | A2 | 12/2010 |
| EP | 2258825 | A2 | 12/2010 |
| SU | 1439119 | A1 | 11/1988 |
| SU | 1763477 | A1 | 9/1992 |
| WO | 2013044984 | A1 | 4/2013 |

OTHER PUBLICATIONS

Translation of EP 2258825 (Year: 2024).*
Office Action Issued for Corresponding CN Application No. 202080016119.1, Dated Apr. 8, 2023.

* cited by examiner

RESIDUE EMPTYING

The present invention relates to a germination box, in particular a device and a method for emptying a germination box.

Germination boxes are used for germinating grains in malting plants. For this purpose, the grain is stored under regulated temperature and humidity conditions in the germination box. Said box is typically rectangular or round and, in the event of a round germination box, may have a diameter of 15-40 m. Such germination boxes are known from EP 2 258 822 and EP 1 641 909, for example. In order to be able to ensure uniform germination, the grain must be turned. For this purpose, a beam is usually provided on which vertically arranged turning screws are mounted. The turning screws are operated in pairs in opposite directions. Tools, which do not extend over the entire terminating edge of the turning screw and are used for loosening the grain during the turning process, can be mounted at a terminating edge of the turning screw, facing towards the base. Without this loosening and the associated lifting of the grain residues or green malt residues from the base of the germination box, the grain or green malt would adhere to the base and solidify.

In the event of a fixed floor, the beam is arranged so as to be movable within the germination box in order to be able to turn the entirety of the grain. This is supported and fixed with a device as is known from DE 10 2004 032 442, for example. In the event that a rotary floor is provided, the beam is fixedly arranged and the base of the floor is arranged so as to be rotatable.

Furthermore, a horizontal conveyor device which is attached to the beam and can be moved in the vertical direction is normally also provided for the loading and unloading of the germination box. After the germination process, the grain or green malt is herewith transported in the direction of an unloading station. The unloading station may be an opening or a discharge chute. The unloading station may be arranged in the center of or at an outer wall inside the germination box.

The turning screws should not extend directly to the base, because the metal of the turning screws would otherwise rub against the metal of the base. A gap of 2 to 3 cm is preferred here since, due to the size of the germination box, manufacturing tolerances and thermal expansion may lead to unevenness of the base. So that the turning screws do not catch on the base or damage it, the turning screws must maintain a predetermined clearance from the base. However, upon unloading the germination box, it is inevitable that grain or green malt residues remain on the turning or conveying screws or on the base of the germination box. Depending on the size of the germination box, several 100 kg can thus remain in the germination box. Therefore, in conventional malting plants the remaining grain or green malt residues are left in the germination box, whereby it leads to a contamination of the new batch or the germination box is cleaned manually. This requires a high investment in time and personnel, as well as stringent safety precautions for working on the machine and in the associated process space.

Therefore, it is an object of the present invention to provide a device and a method which make it possible to perform a removal of residues from the germination box. The invention inventive subject matter, and aspects thereof, are generally described in the appended claims.

The invention comprises a germination box having a container for receiving grain or green malt, wherein the container has a base. A beam is arranged inside the container.

Arranged on the beam is a conveyor device, in particular a worm screw, which is arranged horizontally with respect to the base and serves to load and unload the container, wherein the conveyor device is movable in a vertical direction and substantially parallel to the base. Moreover, a plurality of turning screws, arranged vertically with respect to the base, are mounted on the beam and are operated in pairs in opposite directions in order to turn the grain or green malt. Stripping tools are mounted at the lower end, i.e. at an end of each of the turning screws, facing toward the base. The turning screws are moreover configured to be operated in the same directions in order to empty the germination box.

The clearance between the stripping tools and the base is preferably between 0 and 2 mm, and is particularly preferably 0.5 mm. The stripping tools may project radially beyond the edge of the respective turning screw. The stripping tools may also be of a curved or inclined design. The base preferably has a sieve plate.

The germination box may be designed as a fixed floor or as a rotary floor. The stripping tools may be arranged such that circumferential circles of the stripping tools of adjacent turning screws touch one another. The stripping tools may also be made of plastic or metal.

If the turning screws are turned in the same directions, the grain or green malt residues located on the base may be conveyed in the direction of an unloading station by means of the stripping tools.

The germination box further preferably has a high-pressure spray strip which is mounted on a housing of the conveyor device and which is configured to remove grain or green malt residues from the turning screws by spraying the turning screws. The high-pressure spray strip can preferably be supplied with water.

A method for emptying a germination box and a method for retrofitting a germination box, in particular a germination box according to the preamble of claim 1, are also provided by the invention.

The invention is further described with reference to Figures. The following is shown FIG. 1 an overall perspective view of the device according to the invention FIG. 2 a detailed view of the turning screws according to the invention, in region A of FIG. 1

Figure 3:
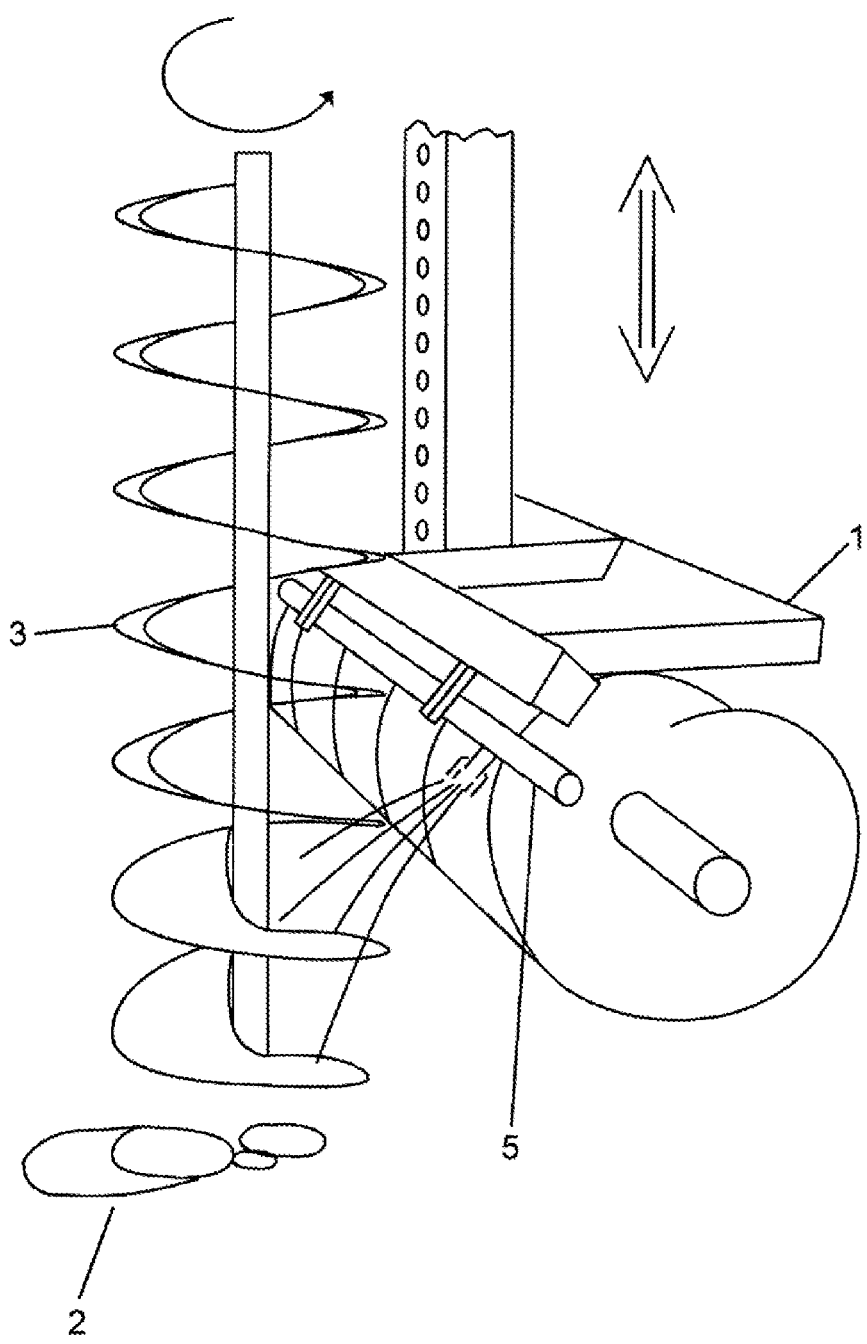

FIG. 3 a detailed view of the conveyor device according to the invention

Figure 4:
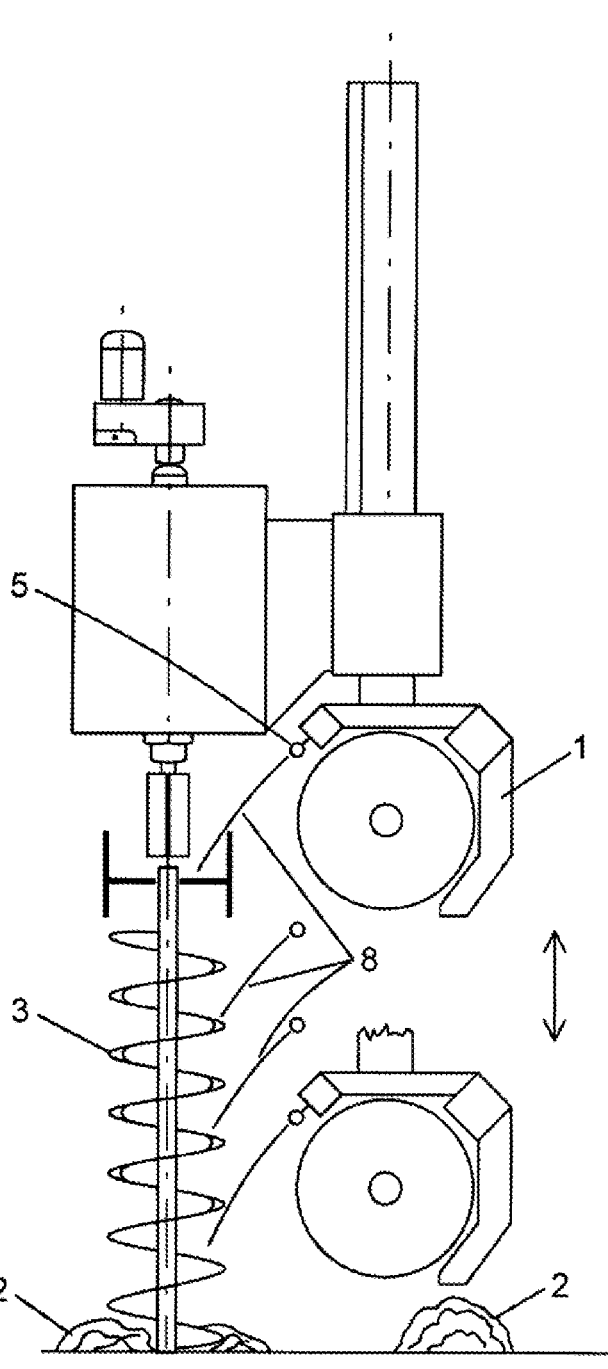

FIG. 4 a side view of the device according to the invention

Figure 5:
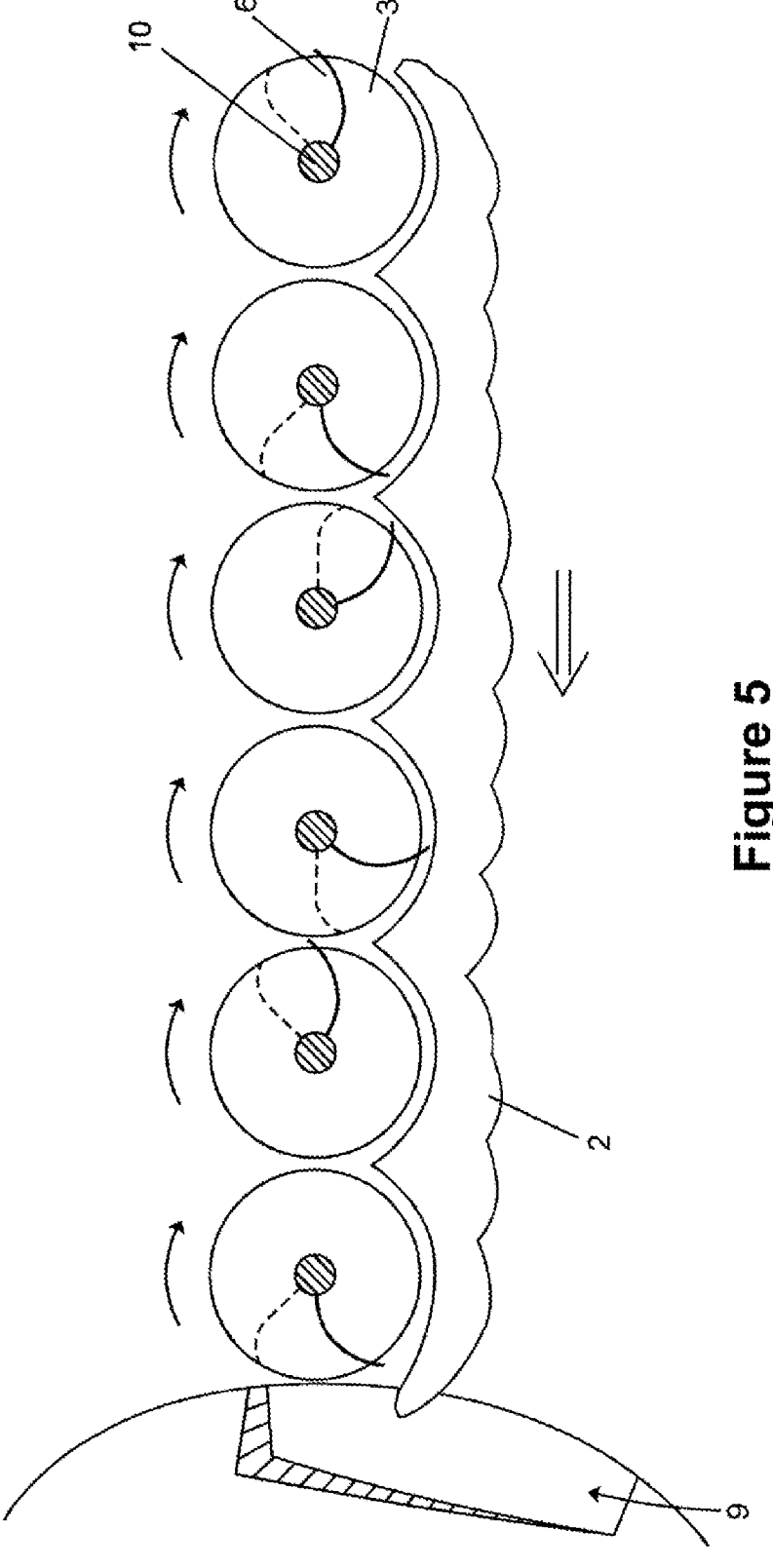

FIG. 5 a schematic view of the turning screws according to the invention

Figure 6:
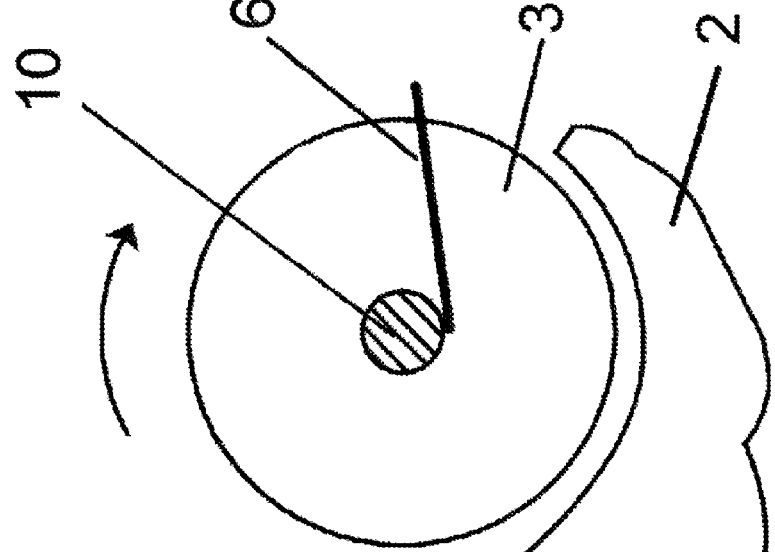

FIG. 6 a further schematic view of the turning screws according to the invention.

FIG. 1 shows an overall perspective view of the device according to the invention. Said device consists of a germination box with a container having a base 7. This may be embodied as a sieve base. The container may be rectangular or round. The container is filled with grain, wherein the batch size may be several 100 t, for example 400 t of barley as a green malt. A specific temperature and humidity are adjusted in the germination box in order to ensure optimal conditions for germinating the grain. Furthermore, a device for discharging $CO_2$ may be provided. Arranged within the container is a beam 4 on which are mounted turning screws 3 vertically aligned with respect to the base 7, and a conveyor device 1 horizontal with respect to the base 7. The conveyor device 1 is movable in a vertical direction. The beam 4 may thereby be movably arranged inside the container. In the event of rectangular germination boxes, the beam 4 is moved linearly within the germination box; in the event of round germination boxes, the beam 4 is moved around the center point of the germination box. This is referred to as a fixed floor. Alternatively, in the event of a round germination box, the base 7 may be movable and the beam 4 static. This is also referred to as a rotary floor.

The conveyor device 1 serves for loading and unloading the germination box with grain or green malt, and is preferably designed as a worm screw. Furthermore, a spray strip for moistening the grain may be attached to the conveyor device 1 in the germination box (not shown). A spray strip for cleaning the base 7 may likewise be mounted. The turning screws 3 are operated in pairs in opposite directions, and either the base 7 or the beam 4 is moved inside the germination box in order to completely turn the grain or green malt during germination. A uniform germination is ensured via the turning, and it is prevented that the sprouts grow together, thus making transport more difficult.

The germination process usually takes 3-5 days, wherein the grain or green malt are turned mechanically at least once per day. After conclusion of the germination process, the grain or green malt is conveyed by means of the conveyor device 1 in the direction of one end of the beam 4 and is discharged there via an unloading station 9, for example a discharge chute. In the event of a round germination box, the unloading station 9 is usually located in the center; in the event of a rectangular germination box, it is usually located along one of the sides of the germination box. However, upon emptying, grain residues or green malt residues 2 inevitably remain on the base 7, the turning screws 3, or the conveyor device 1, or fall from the conveyor device 1 onto the base 7. As a rule, a complete emptying by means of the worm conveyor of the conveyor device 1 is not ensured. The quantity of said grain residues or green malt residues can amount to several 100 kg, depending on the size of the germination box and of the batch contained therein. Calculated on annual production, 300-400 t of end product may be lost.

In conventional installations, these grain residues or green malt residues are either left in the germination box, and thus contaminate the new batch, or they need to be removed manually from the turning screws 3, the conveyor device 1, and the base 7 by means of brooms or the like. However, manual cleaning requires high safety standards, since working under the conveyor device 1 in the germination box is dangerous and measures for securing the conveyor device 1 are thus necessary. In particular, the smooth floor, any cleaning agents used, and moving parts in the installation pose a risk to the cleaning personnel.

Figure 2:
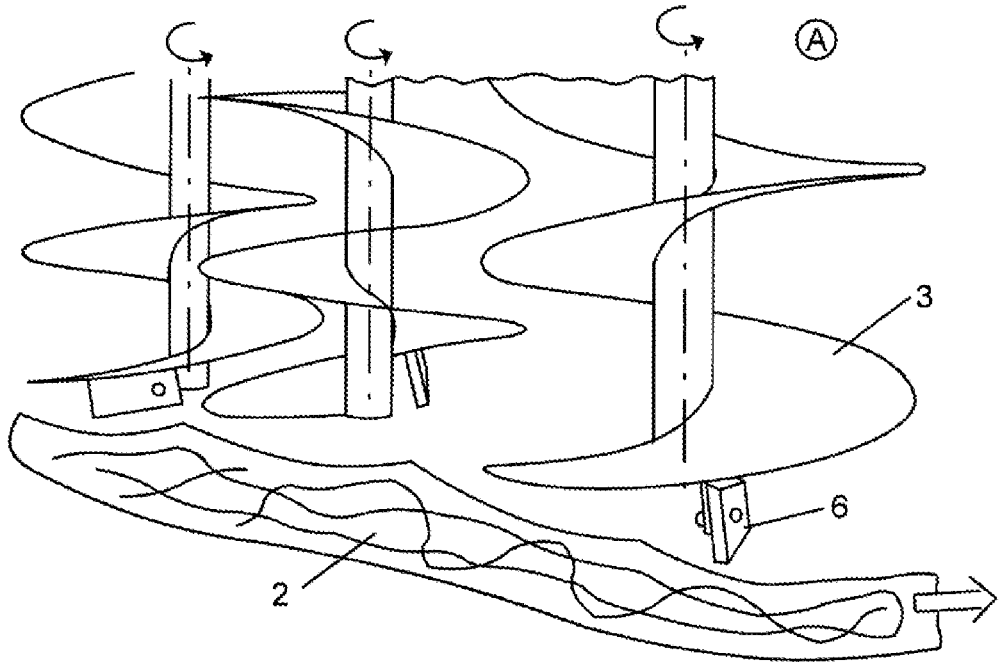

Therefore, means are provided on the device according to the invention in order to enable the system to be emptied of residues automatically. With reference to FIG. 2, stripping tools 6 are provided at the lower end of each of the turning screws 3. The clearance between base 7 and stripping tools 6 is thereby preferably between 0 and 2 mm, particularly preferably 0.5 mm. Furthermore, essentially no gap is formed between the stripping tools 6 of adjacent turning screws 3. That is to say, the circumferential circles of the stripping tools 6 of two adjacent turning screws 3 touch one another. A circumferential circle is to be understood here as the imaginary line which forms the radially outer end of a stripping tool 6 upon rotation of the turning screw 3. In other words, essentially no gap is formed between the areas on the base which are swept over by the stripping tools of two adjacent turning screws. The stripping tools 6 may be made of plastic, metal, or another suitable material. The stripping tools 6 may be retrofitted to existing installations without great effort.

In order to empty the base 7, the surfaces of the helices of the turning screws 3 are first cleaned by means of a water jet from a high-pressure spray strip 5; the remaining product lying thereon falls onto the base of the germination box. The turning screws 3 may rotate in the same directions or in opposite directions. The turning screws 3, which are operated in pairs in opposite directions in conventional operation for turning the grain or green malt during malting, are then operated in the same directions (see rotation direction arrows in FIG. 2), wherein the rotational speed preferably remains essentially unchanged. Grain residues or green malt residues remaining on the base 7 are thereby conveyed by means of the stripping tools 6 from one turning screw 3 to the adjacent turning screw 3, and in the direction of one end of the beam 4 at which the unloading station 9 is located. This is indicated in FIG. 2 by a direction arrow. In other words, in contrast to the operation in pairs in opposite directions, instead of a vertical conveyance or a loosening of the grain or green malt, a horizontal conveyance can be realized by changing the direction of rotation or by operating the turning screws 3 in the same directions. The entire base 7 of the germination box may thus be emptied by driving the beam 4 through the entire germination box, or by turning the base 7. The device for changing the direction of rotation of the turning screws 3 can, for example, be implemented in the context of a software adaptation and with reversing contactors.

FIG. 3 shows a detailed view of the conveyor device 1 according to the invention. A high-pressure spray strip 5 is attached thereto. At least one nozzle is respectively directed toward one of the turning screws 3. A plurality of nozzles may also be provided per turning screw. For this purpose, the available water supply, which is configured to moisten the grain during the malting and to clean the base 7 by means of high pressure, may be used in that the additional high-pressure spray strip 5 is connected thereto. As indicated by the double arrow in FIG. 3, the conveyor device 1 is movable in a vertical direction. By driving the conveyor device 1 up and down while simultaneously rotating the turning screws 3 and operating the high-pressure spray strip 5, the turning screws 3 may thus be freed of grain residues or green malt residues over their entire height. The high-pressure spray strip 5 is thereby preferably operated with little water and a lot of pressure. The falling grain residues or green malt residues are then conveyed in the direction of the unloading station 9 by means of the stripping tools 6 described above, and can be processed further.

FIG. 4 is a side view of the device according to the invention, in which the cleaning of the turning screws 3 is shown by means of driving the conveyor device 1 or the high-pressure spray strip 5 attached thereto up and down. The conveyor device 1 is shown once in the maximum vertical position and once in a vertically lowered position. The water jet 8 of the high-pressure spray strip 5 is depicted with solid lines. Via the high-pressure spray strip 5, the turning screws 3 are freed of grain residues or green malt residues, which thereupon fall on the base 7. Grain or green malt that remains in the conveyor device 1 can also fall off and accumulate on the base 7 as grain residues or green malt residues 2. As described above, the grain residues or green malt residues 2 are then transported in the direction of one end of the beam 4 to the unloading station 9 by means of the turning screws 3 operated in the same directions and the stripping tools 6 (not shown) attached thereto.

FIG. 5 shows a schematic view of the turning screws 3 according to the invention as a plan view of the germination box. The stripping tools are attached to the underside of the last flank profile of the respective turning screw 3, i.e. to the side of the respective turning screw 3 facing toward the base 7. In particular, FIG. 5 shows that the stripping tools 6 may abut the worm shaft 10 of the turning screws 3. In addition, the stripping tools 6 may be of a curved design. In particular, the stripping tools 6 may be concave with respect to the direction of rotation. Alternatively, as shown in FIG. 6, the stripping tools 6 may be attached to the turning screw 3 obliquely with respect to a radial direction. Furthermore, the stripping tools 6 may project beyond the circumference of the turning screws 3. The stripping tools 6 are preferably designed in such a way that the imaginary circumferential circles, which are formed by the radially outer end of the stripping tools 6 upon rotation of the turning screws 3, touch the respective adjacent stripping tools 6. In other words, in the event that the adjacent stripping tools 6 meet one another, essentially no gap is formed between them. The rotation arrows in FIG. 5 show the turning screws 3 operating in the same directions for emptying the germination box. As described above, grain residues or green malt residues are thereby transported in a horizontal direction along the base with the aid of the stripping tools 6. The double arrow illustrates the transport direction of the grain or green malt residues 2 lying on the base in the direction of the unloading station 9, which may be designed as a discharge chute, for example.

The invention further includes a method for emptying a germination box as described above. In particular, the method according to the invention includes emptying the germination box by conveying the grain or green malt by means of the horizontally arranged conveyor device to an unloading station 9, and operating of the turning screws in the same directions in such a way that grain or green malt residues located on the base of the container after emptying are conveyed by means of the stripping tools in the direction of the unloading station 9.

Grain residues or green malt residues are preferably removed from the turning screws by spraying, in particular of water, under high pressure from the high-pressure spray strip arranged on the conveyor device.

In the method according to the invention, the conveyor device 1, and thus also the high-pressure spray strip 5, is preferably moved in the vertical direction during spraying. The movement comprises, in particular, a movement over the entire height of the turning screws 3 in order to be able to completely free them of grain residues or green malt residues.

The invention also comprises a method for retrofitting a germination box, in particular a germination box having a container for receiving grains, wherein the container comprises a base and a beam arranged within the container. The germination box to be retrofitted may preferably also comprise a conveyor device, in particular a worm screw, which is arranged horizontally with respect to the base and serves for loading and unloading of the container, wherein the conveyor device is movable in a vertical direction and may be attached to the beam. Turning screws arranged vertically with respect to the base are attached to the beam. In accordance with the retrofitting method according to the invention, in order to retrofit such a known germination box, stripping tools are attached to the lower end of each of the turning screws and the turning screws are configured in such a way that they can be operated in the same directions.

The method preferably further includes attaching a movable high-pressure spray strip 5 for cleaning the turning screws 3, wherein the high-pressure spray strip 5 has a plurality of nozzles, and wherein in each instance at least one nozzle of the high-pressure spray strip 5 is directed toward a turning screw 3. The high-pressure spray strip 5 may be vertically movable. In the event that a conveyor device 1 as described above is present, the high-pressure spray strip 5 may be mounted on the conveyor device 1.

The described measures, i.e. the stripping tools 6 in conjunction with the operating of the turning screws 3 in the same directions, as well as the high-pressure spray strip 5, may be retrofitted independently of one another in existing installations. Only minor structural changes, such as a reversing contactor or a software adaptation, are necessary for this purpose. Grain residues or green malt residues may be removed from the turning screws 3 by means of the high-pressure spray strip 5 which uses the existing high-pressure system. By changing the direction of rotation of every second turning screw 3 in conjunction with the stripping tools 6 attached to each turning screw 3, remaining grain residues or green malt residues 2 may be transported from the base 7 in the direction of one end of the beam 4 to the unloading station 9. The grain may thus be transported vertically by the turning screws 3 when operated in pairs in opposite directions, and horizontally when operated in the same directions. This enables a substantially more economical operation of the installation and a significant reduction in the amount of grain remaining after the germination box has been emptied by the conveyor device 1. Furthermore, it is no longer necessary for persons to remain in the danger zone under the conveyor device 1 to clean or empty the germination box.

The invention may be used both in a fixed floor, that is to say in an installation in which the base is static but the beam is movable, and in a rotary floor with static beam and movable base.

Although the invention is illustrated and described in detail by means of Figures and the associated description, this illustration and this detailed description are to be understood as illustrative and exemplary, and not as limiting the invention. It is understood that those skilled in the art may make changes and modifications without departing from the scope of the following claims. In particular, the invention also comprises embodiments having any combination of features that are mentioned or shown above with respect to various aspects and/or embodiments.

The invention also includes individual features in Figures, even if they are shown there in connection with other features and/or are not mentioned above.

Furthermore, the term "comprise" and derivatives thereof do not exclude other elements or steps. Likewise, the indefinite article "a" or "an" and derivatives thereof do not exclude a plurality. The functions of a plurality of features listed in the claims may be fulfilled by one unit. The terms "substantially", "around", "approximately", and the like in conjunction with a property or a value also define in particular precisely the property or precisely the value. None of the reference signs in the claims are to be understood as limiting the scope of the claims.

LIST OF REFERENCE SYMBOLS

1 Conveyor device
2 Grain or green malt
3 Turning screw
4 Beam
5 High-pressure spray strip
6 Stripping tool
7 Floor
8 Water jet

9 Unloading station
10 Worm shaft

The invention claimed is:

1. A germination box, comprising:
   a container for receiving grain, wherein the container has a base,
   a beam arranged inside the container, and
   a conveyor device, comprising a worm screw, which is arranged horizontally with respect to the base and serves for loading and unloading of the container, wherein the conveyor device is movable in a vertical direction, and wherein the conveyor device is attached to the beam, and
   a plurality of turning screws arranged vertically with respect to the base and the beam, and,
   turning screw rotating means that rotate each of the plurality of turning screws about a respective axis in a first rotation direction and a second rotation direction opposite the first rotation direction,
   wherein a stripping tool is arranged at an end of each of the turning screws facing toward the base,
   wherein, each turning screw of a corresponding pair of turning screws rotates in a direction that is opposite the other to turn the grain, and
   wherein, each turning screw of the plurality of turning screws rotates in a same direction to empty the grain from the germination box.

2. The germination box according to claim 1, wherein the clearance between the stripping tools and the base is between 0 and 2 mm, and is preferably 0.5 mm.

3. The germination box according to claim 1, wherein the stripping tools project radially beyond the edge of the respective turning screw.

4. The germination box according to claim 1, wherein the stripping tools are of a curved design.

5. The germination box according to claim 1, wherein the base has a sieve plate.

6. The germination box according to claim 1, wherein the stripping tools are arranged in such a way that circumferential circles of the stripping tools of adjacent turning screws touch each other.

7. The germination box according to claim 1, wherein the stripping tools are made of plastic or metal.

8. The germination box according to claim 1, wherein the grain located on the base is conveyed in the direction of an unloading station by means of the stripping tools upon rotating the turning screws in the same directions.

9. The germination box according to claim 1, wherein the germination box further has a high-pressure spray strip which is mounted on a housing of the conveyor device and which is configured to remove grains from the turning screws by spraying the turning screws.

10. The germination box according to claim 9, wherein the high-pressure spray strip can be supplied with water.

11. A method for emptying a germination box according to claim 1, having the steps of
   emptying the germination box by conveying the grain by means of the conveyor device to an unloading station,
   operating the turning screws in the same directions in such a way that grain located on the base of the container after emptying is conveyed in the direction of the unloading station by means of the stripping tools.

12. The method according to claim 11 for emptying a germination box comprising:
   a container for receiving grains, wherein the container has a base,
   a beam arranged inside the container, and
   a conveyor device, comprising a worm screw, which is arranged horizontally with respect to the base and serves for loading and unloading of the container, wherein the conveyor device is movable in a vertical direction, and wherein the conveyor device is attached to the beam, and a plurality of turning screws arranged vertically with respect to the base on the beam, wherein the turning screws are operated in pairs in opposite directions in order to turn the grain, wherein
   a stripping tool is arranged at an end of each of the turning screws facing toward the base, and
   the turning screws are configured to be operated in the same directions in order to empty the germination box,
   wherein the grain located on the base is conveyed in the direction of an unloading station by means of the stripping tools upon rotating the turning screws in the same directions,
   wherein the germination box further has a high-pressure spray strip which is mounted on a housing of the conveyor device and which is configured to remove grains from the turning screws by spraying the turning screws,
   wherein grain residues or green malt residues are removed from the turning screws by spraying liquid water, under high-pressure onto the turning screws from the high-pressure spray strip arranged on the conveyor device.

13. The method according to claim 12, wherein the conveyor device, and thus also the high-pressure spray strip, are moved in a vertical direction during spraying.

\* \* \* \* \*